March 3, 1970  J. B. ERIKSEN  3,498,442
DEVICE FOR TURNING FISH
Filed June 23, 1967  2 Sheets-Sheet 1
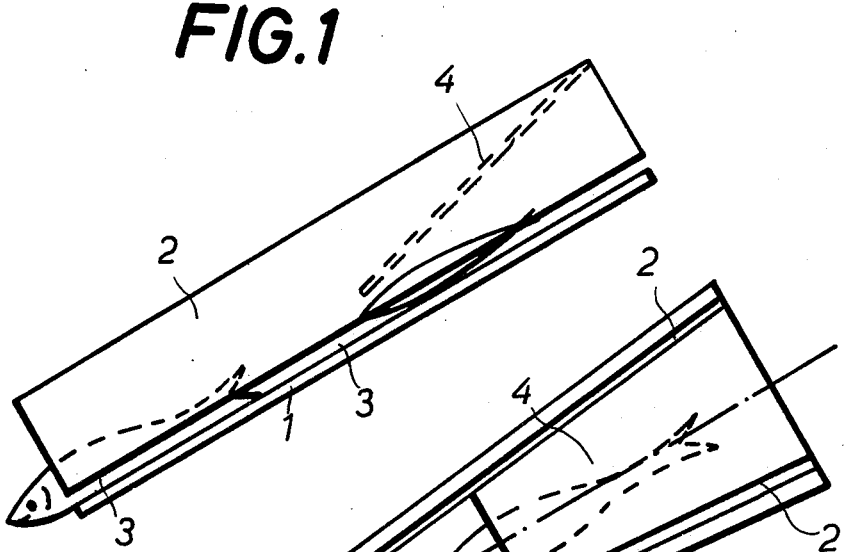
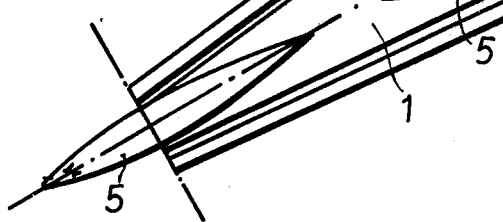
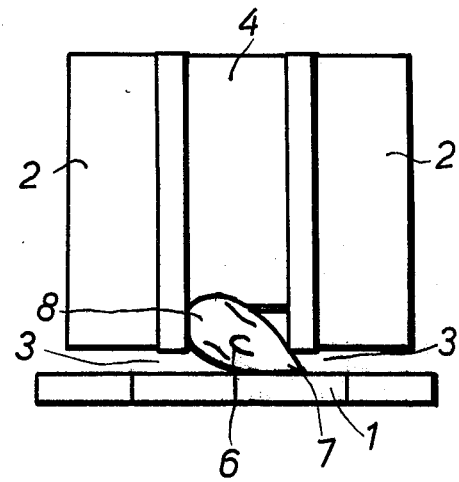
INVENTOR
JAN BERGH ERIKSEN
BY
*Young & Thompson*
ATTORNEYS

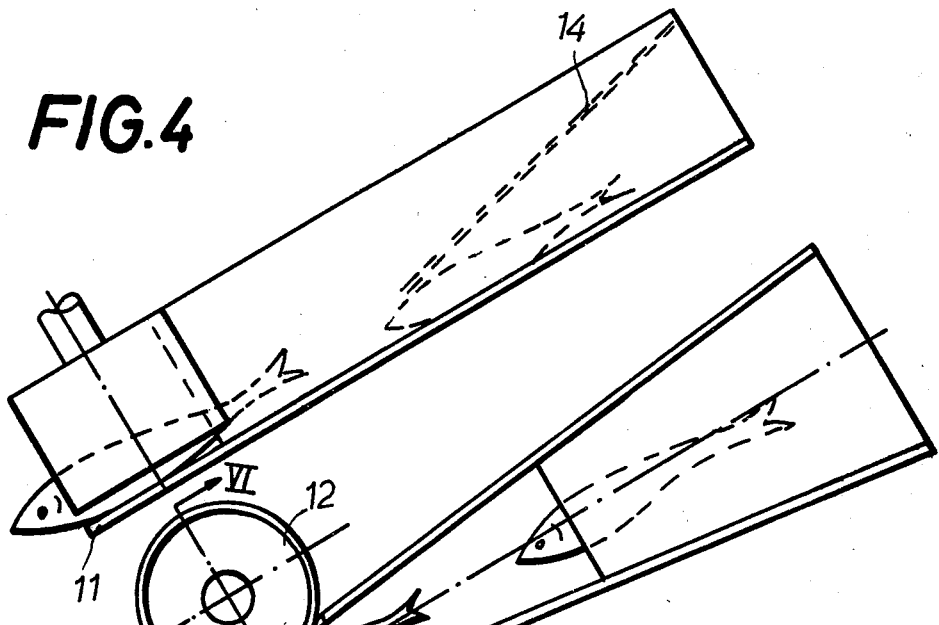
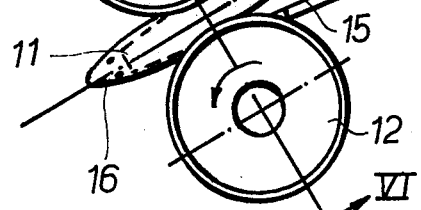
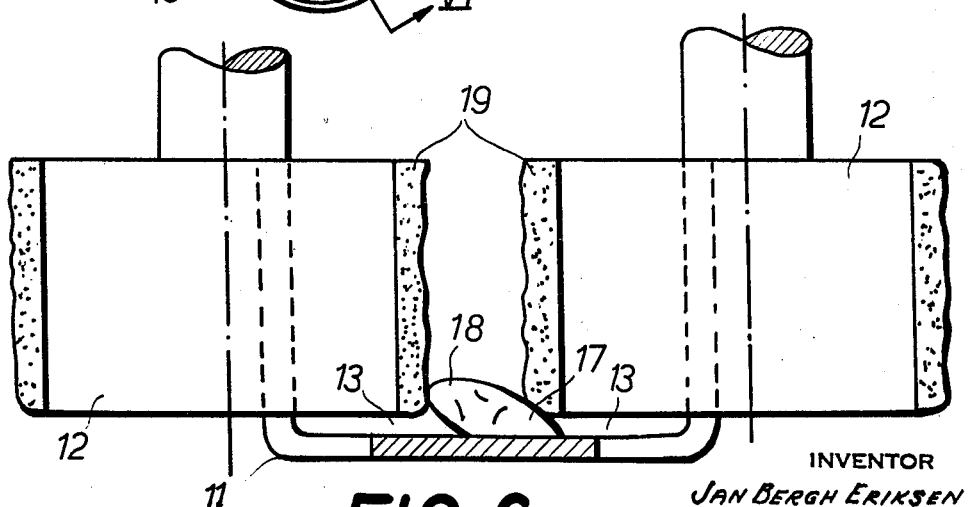

3,498,442
DEVICE FOR TURNING FISH
Jan Bergh Eriksen, Stavanger, Norway, assignor to Trio Fabrikker, A/S de Forenede Norske Laase- og Beslagfabriker, Stavanger, Norway
Filed June 23, 1967, Ser. No. 648,421
Claims priority, application Norway, July 1, 1966, 163,748
Int. Cl. B65g 47/24
U.S. Cl. 198—33                                 3 Claims

ABSTRACT OF THE DISCLOSURE

A device for turning fish fed head first through a converging channel, the throat part of the fish slipping into a slot between the bottom and one of the side walls of the channel, thereby forcing the back of the fish uppermost in the narrow end of the channel.

---

This invention relates to a device for turning fish which are fed head first into a channel the side walls of which converge in the direction of movement of the fish, and which is fitted with a device which, after the introduction of a fish, forces its one side against the bottom of the channel.

When automatically handling fish it is often necessary to orient each individual fish with the back in a particular position, and the purpose of this invention is, by means of a device of the above mentioned type, to bring about the turning of the fish in such a manner that it is delivered from the device on edge with the back uppermost.

This is achieved according to the invention by there being at the exit end of the channel and at the transition to the bottom at both sides, longitudinal openings, into one of which the neck part (or throat part) of the fish enters during the movement of the fish, and the fish thus in the narrow passage is forced on edge with the back uppermost and the belly part in the opening.

In an expedient design of a device according to the invention, the openings may have the form of a slit between the bottom and each of the side walls.

In a second expedient design of the device according to the invention, the openings may have the form of a slit between an extension of the bottom of the channel and two rotating rollers of which those parts of the circumferential surfaces which face one another form an extension of the side walls of the channel.

Two examples of the invention will be described in more detail with reference to the drawings.

FIGURE 1 shows a side view of a first design of a device according to the invention.

FIGURE 2 shows a top view of FIGURE 1.

FIGURE 3 shows the device of FIGURES 1 and 2 seen towards the exit end.

FIGURE 4 shows a side view of a second design of a device according to the invention.

FIGURE 5 shows a top view of FIGURE 4.

FIGURE 6 shows a section along the line VI—VI in FIGURE 5.

In the example of FIGURES 1–3 the channel consists of a bottom plate 1 and two side walls 2 which converge towards the exit end. Between the bottom plate 1 and the side walls 2 there are longitudinal slits 3 and the distance between the bottom plate 1 and the side walls 2 must be adjusted according to the size of the head of the fish. The fish is fed into the channel head first and the movement of the fish in the channel may be as shown in the drawing with the inclined position of the channel such that it tilts towards the exit end, possibly with the additional aid of vibration, or the bottom may be made in the form of a conveyor belt. At the input end of the channel there is a guide plate 4 which forces the fish 5 with the one side against the bottom. As most fish have markedly drop-shaped cross-section of the head 6, the throat 7 and thus the belly of the fish enters into the slit 3 whilst the upper part 8 of the head, and thus the back, glides up the side wall 2, in such a manner that the fish comes out of the device with its back uppermost.

In the device as shown in FIGS. 4–6, the channel is shown without any slit between the bottom and its side walls, and the bottom has an extension 11. Also in this case there is a guide plate 14 at the input end. At the exit end of the channel there are two rotating rollers 12 of which those parts of the circumference which face one another form a continuation of the side walls of the channel. The rollers 12 may be covered with a friction covering 19 to ensure that the fish is moved along. Between the lower side edge of the rollers 12 and the extension 11 of the bottom there are slits 13 and the distance between the extension 11 of the bottom and the side edge of the rollers 12 is adjusted to suit the head size of the fish, in such a manner that when the fish is moved down the channel which is in an inclined position, the throat 17 and thus the belly part of the fish will enter the slit 13 in such a manner that the upper side 18 of the head 16 of the fish 15 and thus the back will be pressed up along the circumferential surface of the rollers 12 in the narrow passage, in such a way that the fish is delivered from the device with its back uppermost.

Having described my invention, I claim:

1. A device for turning fish so that their backs are uppermost, comprising a channel having a bottom wall and converging side walls, means for positioning fish on their side as they move on said bottom wall head first in the direction of convergence of said side walls, each of said side walls being spaced from said bottom wall by a slit that is of a width to receive the under side but not the back of the fish so that the under side of the fish enters the slit associated with one of the side walls as the fish moves head first through the channel and the other side wall contacts the back of the fish to turn the fish with its back uppermost.

2. A device as claimed in claim 1, said side walls being fixed and said slits extending lengthwise of said side walls.

3. A device as claimed in claim 1, said side walls being comprised by a pair of rollers disposed on opposite sides of the channel, that rotate in the direction of travel of the fish at their points of nearest approach to each other.

References Cited

UNITED STATES PATENTS

| 1,893,903 | 1/1933  | Mullins       | 17—2   |
| 3,229,326 | 1/1966  | Eriksen       | 17—2   |
| 3,232,412 | 2/1966  | Blöss         | 17—2 X |
| 3,237,750 | 3/1966  | Eriksen       | 17—2 X |
| 3,315,299 | 4/1967  | Danielsson    | 17—2   |
| 3,348,260 | 10/1967 | Bartels et al.| 17—2   |

RICHARD E. AEGERTER, Primary Examiner

U.S. Cl. X.R.

193—43